(12) United States Patent
Nilsson

(10) Patent No.: US 9,387,769 B2
(45) Date of Patent: Jul. 12, 2016

(54) CIRCUIT FOR CHARGING A BATTERY AND FOR DRIVING A THREE-PHASE ELECTRICAL MACHINE

(71) Applicant: VOLVO CAR CORPORATION, Goeteborg (SE)

(72) Inventor: Mats Nilsson, Kungsbacka (SE)

(73) Assignee: Volvo Car Corporation, Gothenburg (SE)

( * ) Notice: Subject to any disclaimer, the term of this patent is extended or adjusted under 35 U.S.C. 154(b) by 679 days.

(21) Appl. No.: 13/796,331

(22) Filed: Mar. 12, 2013

(65) Prior Publication Data

US 2013/0265011 A1    Oct. 10, 2013

(30) Foreign Application Priority Data

Apr. 4, 2012   (EP) ..................................... 12163125

(51) Int. Cl.
*H02J 7/00* (2006.01)
*B60L 11/18* (2006.01)

(52) U.S. Cl.
CPC ......... *B60L 11/1814* (2013.01); *B60L 2220/54* (2013.01); *Y02T 10/641* (2013.01); *Y02T 10/7005* (2013.01); *Y02T 10/7072* (2013.01); *Y02T 90/127* (2013.01); *Y02T 90/14* (2013.01)

(58) Field of Classification Search
CPC .................................................. B60L 11/1814
USPC .......................................... 320/128, 137, 138
See application file for complete search history.

(56) References Cited

U.S. PATENT DOCUMENTS

| | | | | |
|---|---|---|---|---|
| 6,160,722 A | * | 12/2000 | Thommes | ............... H02J 9/061 307/68 |
| 2011/0187185 A1 | | 8/2011 | Dupuy | |
| 2014/0191720 A1 | * | 7/2014 | Sugiyama | ............. B60L 3/0069 320/109 |

FOREIGN PATENT DOCUMENTS

| | | |
|---|---|---|
| EP | 2116405 | 11/2009 |
| JP | 2000354331 | 12/2000 |
| WO | 2012035832 | 3/2012 |

OTHER PUBLICATIONS

Extened European Search Report for EP 12163125.3, Completed by the European Patent Office on Oct. 9, 2012, All together 6 Pages.

* cited by examiner

*Primary Examiner* — Richard V Muralidar
(74) *Attorney, Agent, or Firm* — Brooks Kushman P.C.

(57) ABSTRACT

A circuit is provided for charging a battery and for driving an electrical machine. The circuit includes at least three static inductors in Wye configuration having a first charging terminal connected to the center point. The circuit also includes a three-phase inverter having switches and rectifying elements, two DC terminals for connecting the battery to the circuit, and three phase terminals for connecting the circuit to the inductors. The circuit also includes a first rectifying element and a second rectifying element connected in series, with a second charging terminal between the first rectifying element and the second rectifying element. The series of the first rectifying element and the second rectifying element is connected to the inverter parallel to the DC terminals and the first rectifying element and the second rectifying element have the same orientation as the rectifying elements of the inverter as to form a full-bridge rectifier.

20 Claims, 4 Drawing Sheets

CIRCUIT FOR CHARGING A BATTERY AND FOR DRIVING A THREE-PHASE ELECTRICAL MACHINE

CROSS-REFERENCE TO RELATED APPLICATIONS

This application claims foreign priority under 35 U.S.C. §119(a)-(d) to European patent application number EP 12163125.3, filed Apr. 4, 2012, which is incorporated by reference in its entirety.

TECHNICAL FIELD

The disclosure relates to a circuit for charging a battery and for driving a three-phase electric machine.

BACKGROUND

US patent application 2011/0187185 discloses an electric traction chain for an automobile, including an onboard rechargeable power source, a static converter capable of generating a three-phase voltage system connected by input to the rechargeable power source, a three phase electric motor supplied with power by the three-phase voltage system generated by the static converter, wherein an external electric power source is connectable to the stator windings of the motor to enable recharging of the onboard power source across the static converter.

An issue with this electric traction chain is that it is not very practical for charging by means of a one phase power line in case the electrical machine—the electromotor—comprises permanent magnets in the rotor, because the inductors of the stator are not equally charged. With permanent magnets in the rotor, this causes the rotor to move.

SUMMARY

It is preferred to provide a simple driving and charging circuit with a low number of components.

A first aspect provides a circuit for charging a battery and for driving a three-phase electrical machine comprising at least three static inductors in Wye configuration having a first charging terminal connected to the center point. The circuit comprises a three-phase DC to AC converter comprising a plurality of switches and rectifying elements, two DC terminals for connecting the battery to the circuit and three phase terminals for connecting the circuit to the inductors. The circuit further comprises a first rectifying element and a second rectifying element connected in series to one another, with a second charging terminal being provided between the first rectifying element and the second rectifying element. The series of the first rectifying element and the second rectifying element is connected to the DC to AC converter parallel to the DC terminals and the first rectifying element and the second rectifying element have the same orientation as at least two of the rectifying elements of the DC to AC converter as to form a full-bridge rectifier with the rectifying elements of the DC to AC converter for rectifying an alternating voltage applied over the first charging terminal and the second charging terminal to provide a rectified voltage between the two DC terminals.

Static converters, electrical inverters and other DC to AC converters comprise rectifying elements—and diodes in particular—whether single level or multilevel, comprise rectifying elements like diodes and switches, with the diodes in the same orientation with respect to the DC terminals. By providing two additional diodes in series, with a charging terminal provided between them, a full-bridge rectifier can be created. Half the rectifier is provided by the additional two diodes, the other half is provided by the inverter. This allows charging of a battery by means of an alternating current signal. Numerous topologies are available for DC to AC converters comprising rectifying elements and switches, though all have at least two rectifying elements in series that can be used as one half for a full-bridge rectifier.

In an embodiment, the DC to AC converter comprises three pairs of two groups of a switch and a rectifying element connected in parallel, the two groups being connected in series to one another with a phase terminal being provided between the two groups and the pairs being connected in parallel to one another and wherein the rectifying elements all have the same orientation.

Such inverter has a simple and feasible design, with a low component count. The full bridge rectifier is provided by one or more pairs of groups of a switch and a rectifying element connected in parallel as a first half and the two additional rectifying elements as a second half.

An embodiment further comprises a DC to DC converter for reducing a converter voltage provided by the DC to AC converter to a charging voltage lower than the converter voltage, the input of the DC to DC converter being connected parallel to the DC part of the DC to AC converter and the output of the DC to DC converter being connected to the two DC terminals.

A second aspect provides a driving and charging module for a vehicle comprising: a three-phase electrical machine comprising at least three inductances in Wye configuration, a connector connected to the first charging terminal and the second charging terminal and any circuit according to the first aspect and embodiments thereof.

Such module is ready to be assembled in a vehicle. The connector is provided for connecting the module to a one-phase charging source, like a wall socket. In this case, the connector is of the male type. Alternatively, the connector is of the female type for connecting an extension cord. The latter option is also feasible with the connector being of the male type.

In a third aspect, a vehicle is provided comprising: at least two wheels; the module according to the second aspect, a control module for controlling the switches of the circuit; and a battery being connected to the module. In the vehicle, at least one of the two wheels is connected to the three-phase electrical machine for driving the wheel.

Such vehicle may be a car, a bicycle, a lorry, a toy or other.

BRIEF DESCRIPTION OF THE DRAWINGS

The disclosure will now be discussed in further detail by means of Figures. In the Figures.

DETAILED DESCRIPTION

Figure 1:
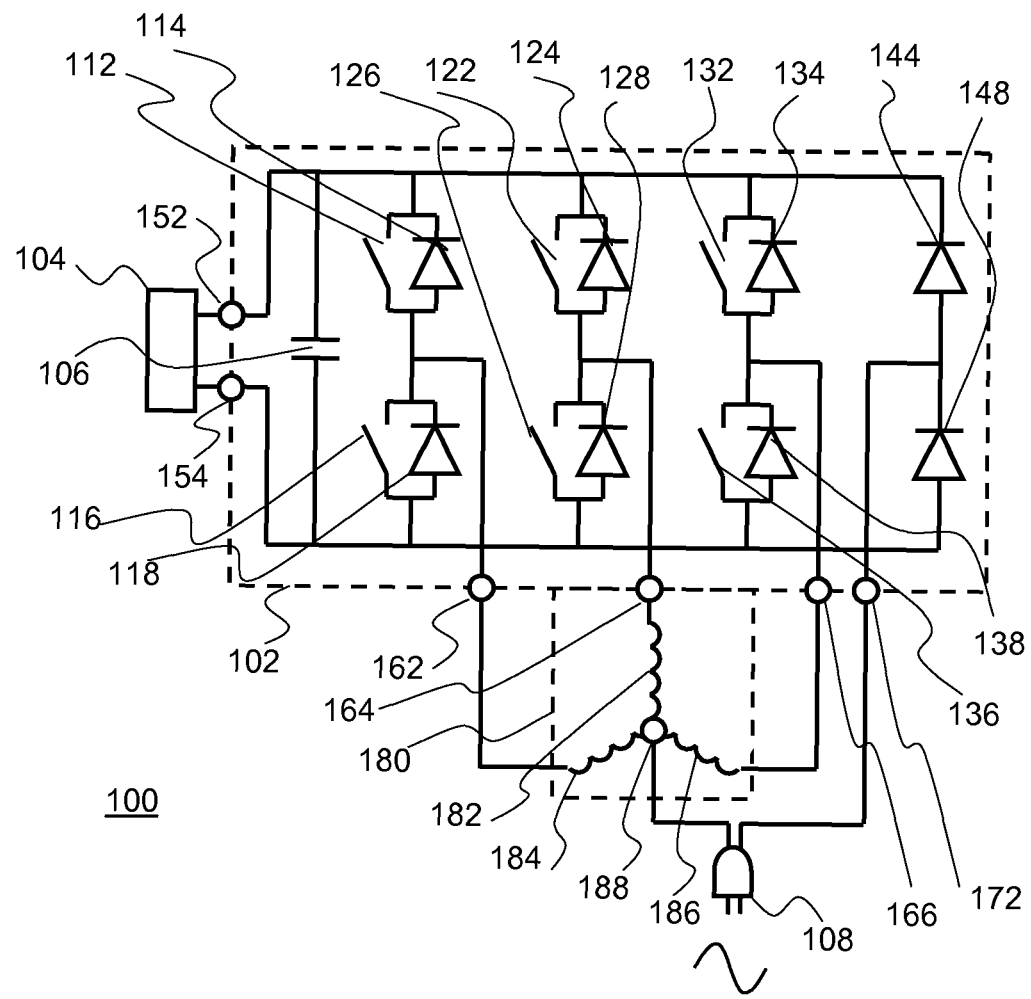
FIG. 1 shows: a charging and driving module.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As required, detailed embodiments are disclosed herein. However, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art. Throughout the following description similar reference numerals have been used to denote similar elements, parts, items or features, when applicable.

FIG. 1 shows a charging and driving module 100 for a vehicle. The charging and driving module 100 comprises an inverter circuit 102, an electrical machine 180, a battery 104 and a plug 108. The inverter circuit 102 arranged for driving the electrical machine 180 and for charging the battery 104.

The electrical machine 180 comprises a first inductor 182, a second inductor 184 and a third inductor 186. The three inductors are connected in Wye configuration, with a common center point at which center point a first charging terminal 188 is provided. The three inductors are preferably static inductors, acting as a stator for the electrical machine 180. The rotor is preferably provided with permanent magnets provided on a shaft. By providing alternating currents through the static inductors, each current having a phase shift of preferably 120° or ⅔ π, the rotor may be driven to establish a rotary movement of the rotor and the shaft.

Figure 2:
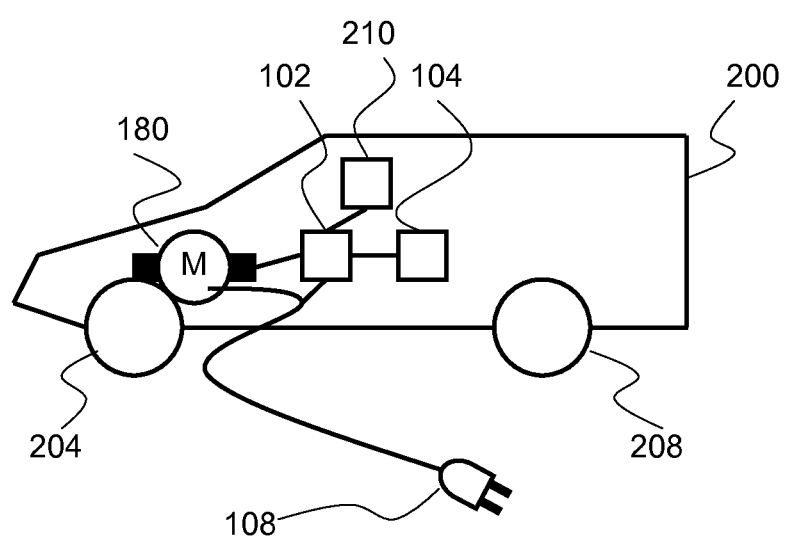
FIG. 2 shows: a vehicle comprising the charging and driving module.

The charging and driving module 100 is arranged for use in a car 200 as depicted by FIG. 2. The car 200 comprises the inverter circuit 102, the battery 104, the plug 108 and the electrical machine 180 for driving a front wheel 204. Alternatively or additionally, also a rear wheel 208 may be driven as well, by the electrical machine 180 or an additional electrical machine. The car 200 also comprises a control circuit 210 for driving the inverter circuit 102.

The inverter circuit 102 comprises a first group comprising a first switch 112 in parallel with a first diode 114, which group is in series with a second group comprising second switch 116 and a second diode 118 in parallel. In parallel with the two groups of switches and diodes, a group of a third switch 122 and a third diode 124 in parallel is provided in series with a group of a further switch 126 and a fourth diode 128 in parallel. Also a group of a fifth switch 132 and a fifth diode 134 in parallel in series with a group of a sixth switch 136 and a sixth diode 138 in parallel which groups are arranged in series and—in series—are placed parallel with the other groups in series. Hence, three pairs of two groups of a switch and a diode connected in parallel are provided, the two groups being connected in series to one another and the pairs are connected in parallel to one another. The diodes all have the same orientation.

The inverter circuit further comprises a capacitor 106 in parallel to the pairs of groups of a switch and a diode and a first DC terminal 152 and a second DC terminal 154 for connecting the battery 104 in parallel to the capacitor. In parallel to the capacitor, also a seventh diode 144 and an eight diode 148 connected in series are connected to the inverter circuit 102.

Between each of the three groups of switches and diodes, terminals are provided for connecting the inverter circuit 102 to the electrical machine 180. Between the first switch 112 and first diode 114 on one hand and the second switch 116 and the second diode 118 on the other hand, a first phase terminal 162 is provided. Between the third switch 122 and third diode 124 on one hand and the fourth switch 126 and the fourth diode 128 on the other hand, a second phase terminal 164 is provided. Between the fifth switch 132 and fifth diode 134 on one hand and the sixth switch 136 and the sixth diode 138 on the other hand, a third phase terminal 166 is provided. And between the seventh diode 144 and the fourth diode 148, a second charging terminal 172 is provided.

A charging plug 108 is connected to the first charging terminal 188 and the second charging terminal 172.

For driving the electrical machine 180, the switches of the inverter circuit are operated to generate a sine wave at each phase terminal of the inverter circuit 102. This is done by operating the switches in a pulse width modulation (PWM) operation mode. The sine waves at the phase terminals are shifted 120° or ⅔ π. By changing the frequency of the sine waves, the rotating frequency of the electrical machine 180 can be modified. In this way, a DC voltage provided by the battery 104 is converted to a three-phase AC voltage available at the first phase terminal 162, the second phase terminal 164 and the third phase terminal 166.

The PWM signal may be generated by comparing a sine wave of a target frequency as a reference signal with a saw tooth waveform having a significantly higher frequency, preferably at least ten times as high. The output is a binary signal, changing from 0 to 1 on a continuous timescale. This signal is used to drive the first switch 112. The complement of the signal is used to drive the second switch 116. A further signal for driving the third switch 122 and the fourth switch 126 is generated by shifting the reference signal by 120° or ⅔ π, where the fourth switch 126 is driven by the complement of the generated further control signal. Another signal for driving the fifth switch 132 is generated by shifting the first reference signal by 240° or ⁴⁄₃ π, where the sixth switch 136 is driven by the complement of the generated other control signal. In this way, a fair approximation of a sine wave is generated. Less accurate approximations may also be used, like a block wave or a modified sine wave, but at the cost of efficiency of the electrical machine 180.

The battery 104 is a rechargeable battery that can be charged by via the plug 108 that is connected to the charging and driving module 100. For basic charging operation of the inverter circuit 102 for charging the battery 104, all switches of the inverter circuit 102 are opened, i.e. in non-conductive state. The plug 108 is connected to mains power supply, preferably at 230 Volt at 50 Hz—or 110 Volt at 60 Hz.

In basic charging operation, the inverter circuit, with the three pairs of switch-diode groups, acts as a full-bridge rectifier. The first diode 114, the third diode 124 and the fifth diode 134 are connected in parallel and the second diode 118, the fourth diode 128 and the sixth diode 138 are connected in parallel. This is because the three inductances 182, 184, 186 of the electrical machine 180, connected to the phase terminals, are connected together and provided with a single phase voltage and all switches are open. These groups form one half of the rectifier, equivalent to two diodes in series, with one single phase terminal connected between them. Another half of the full-bridge rectifier is provided by the seventh diode 144 and the eighth diode 148. This circuit equivalent of the configuration is depicted by FIG. 3.

Figure 3:
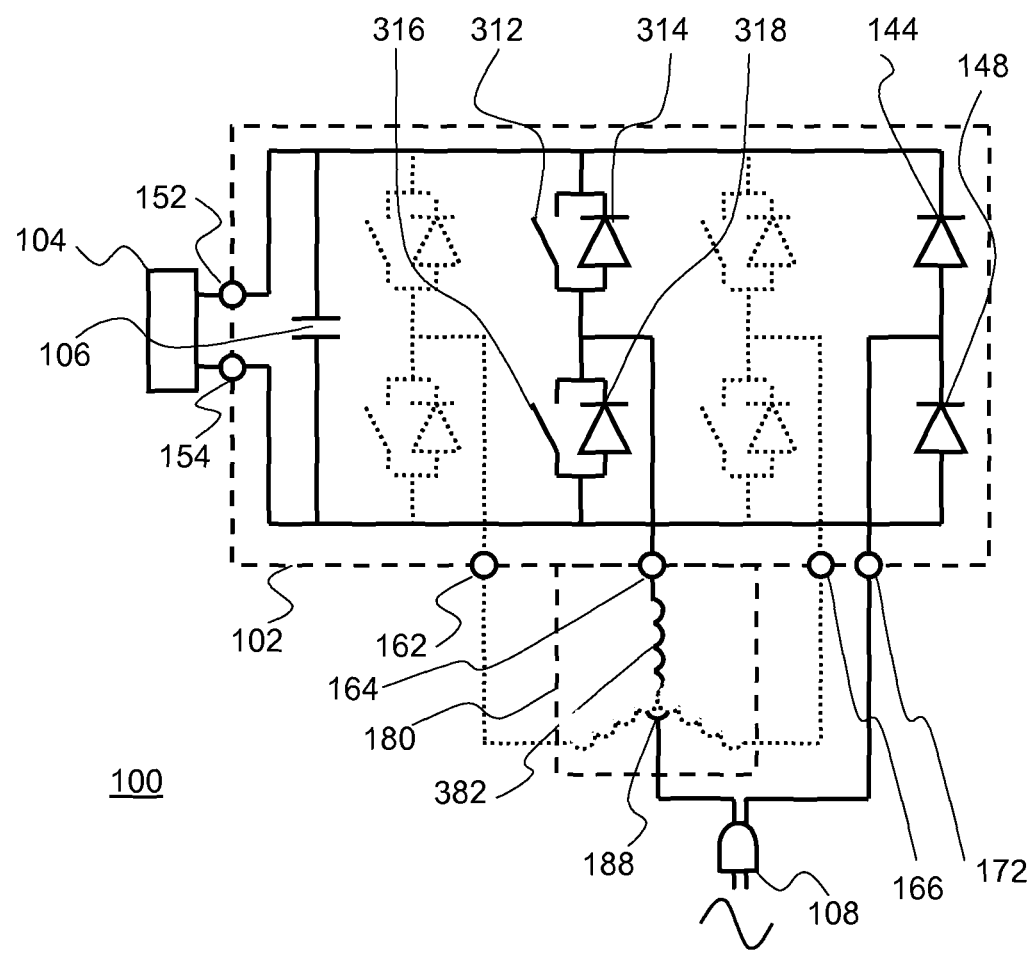
FIG. 3 shows: an equivalent of the charging and driving module during charging operation.

In FIG. 3, the full-bridge rectifier is provided by the seventh diode 144 and the eighth diode 148 on one hand and the first diode equivalent 314 and the second diode equivalent 318. The first diode equivalent 314 is equivalent to the first diode 114, the third diode 124 and the fifth diode 134 in parallel and the second diode equivalent 318 is equivalent to the second diode 118, the fourth diode 128 and the sixth diode 138 in parallel.

In this way, a single-phase alternating current signal supplied to the plug 108 is converted to a direct current signal, equalized by the capacitor 106 and provided to the battery 104.

In case the battery requires a voltage higher than the top voltage of the mains power supply, the switches of the inverter circuit are operated simultaneously in the charging phase. Together with the inductances of the electrical machine 180, this constitutes a power factor control circuit for increasing the output voltage over the first DC terminal 152 and the second DC terminal 154. The actual output voltage over the first DC terminal 152 and the second DC terminal 154 depends on the duty cycle of the switching of the six switches of the inverter circuit 102.

It is important that the first switch 112, the third switch 122 and the fifth switch 132 are operated simultaneously and that the second switch 116, the fourth switch 126 and the sixth switch 136 are operated simultaneously as well in a charging operation via the plug 108. This is because in plug-in charging operation, the car 200 should be and remain stationary and the electrical machine 180 is not to rotate to prevent accidents. Therefore, the current through the three inductances should be substantially the same at each moment in time—which is established by operating the switches simultaneously as indicated above.

Figure 4:
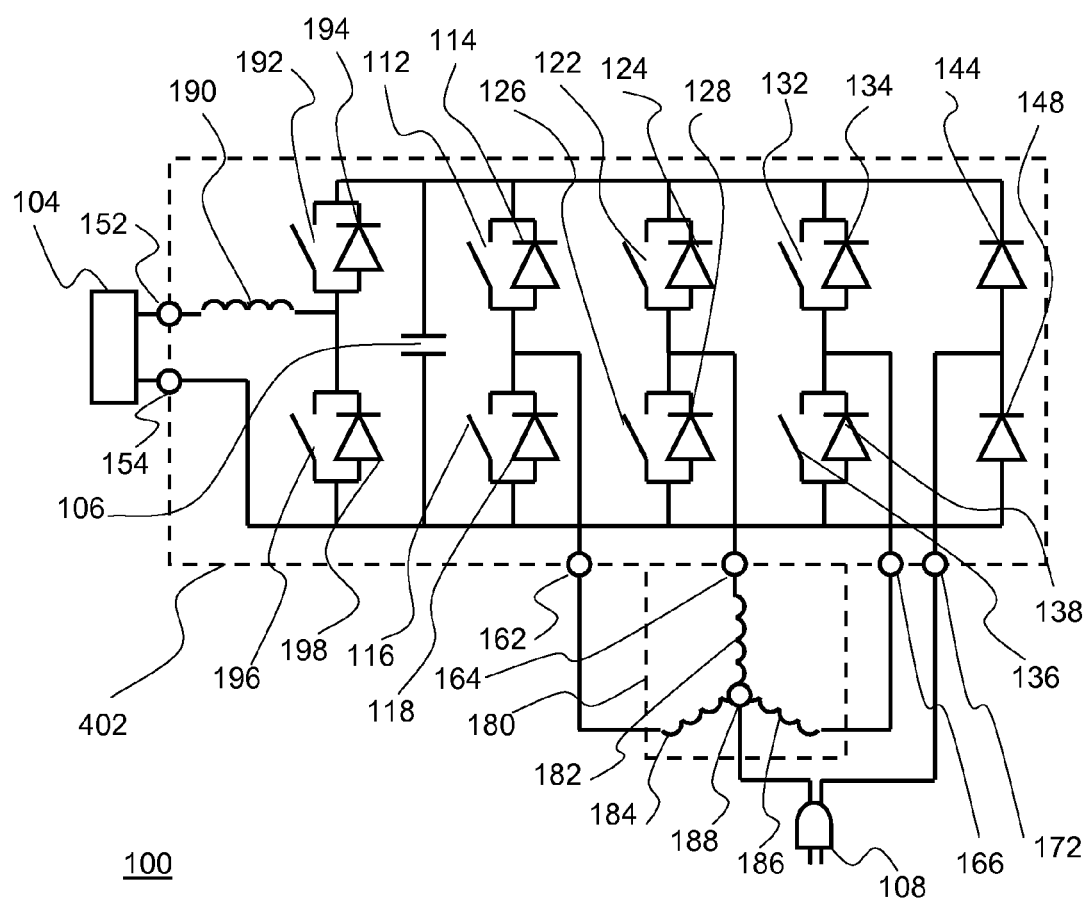
FIG. 4 shows: another charging and driving module.

On the other hand, in case the batter 104 requires a lower voltage than the top voltage of mains power supply provided to the plug 108, the inverter circuit 102 as shown by FIG. 1 is not sufficient. An inverter circuit 402 as depicted by FIG. 4 comprises a buck converter for converting down the voltage provided by the inverting part of the inverter circuit 402. The buck converter comprises a first buck switch 192, a first buck diode 194, a second buck switch 196, a second buck diode 198 and a buck inductor 190. A person skilled in the art will appreciate that the first buck diode 194 and the second buck switch 196 are optional and may be omitted. The final output voltage provided to the battery 104 is determined by the input voltage, the value of the buck inductor 190 and the duty cycle of the first buck switch 192.

A person skilled in the art will appreciate that various variations to the embodiments as provided above are possible. Instead of the diodes, also other rectifying elements may be used, either active or passive. For the switches, any suitable electronic switch may be used, including, but not limited to Triacs, IGBTs, GTOs, MOSFETs and other. As to the car 200, it is noted that the charging and driving module 100 may also be used for other vehicles like a bicycle.

The circuit 102 of the disclosure can also be used without further amendments when direct voltage is applied over the first charging terminal 188 and the second charging terminal 172 for charging the battery 104. Moreover, the full-bridge rectifier of the disclosure allows the positive and negative conductors of the direct voltage power supply to be connected to the first charging terminal 188 and second charging terminal 172 in any order.

The combined inverter and on-board charger may preferably be realized by using an existing inverter control module 210, and merely modifying the software thereof to include a charging mode. The other modifications that are required are relatively small hardware modifications, such as adding the first and second rectifying elements 144, 148, the first charging terminal 188 connected to the center point of the three static inductors 182, 184, 186, and the second charging terminal 172.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

In the description above, it will be understood that when an element such as layer, region or substrate is referred to as being "on", "onto" or "connected to" another element, the element is either directly on or connected to the other element, or intervening elements may also be present.

Furthermore, the disclosure may also be embodied with less components than provided in the embodiments described here, wherein one component carries out multiple functions. Just as well may the disclosure be embodied using more elements than depicted in the Figures, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the disclosure.

As required, detailed embodiments are disclosed herein. However, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art. Throughout the following description similar reference numerals have been used to denote similar elements, parts, items or features, when applicable.

FIG. 1 shows a charging and driving module 100 for a vehicle. The charging and driving module 100 comprises an inverter circuit 102, an electrical machine 180, a battery 104 and a plug 108. The inverter circuit 102 arranged for driving the electrical machine 180 and for charging the battery 104.

The electrical machine 180 comprises a first inductor 182, a second inductor 184 and a third inductor 186. The three inductors are connected in Wye configuration, with a common center point at which center point a first charging terminal 188 is provided. The three inductors are preferably static inductors, acting as a stator for the electrical machine 180. The rotor is preferably provided with permanent magnets provided on a shaft. By providing alternating currents through the static inductors, each current having a phase shift of preferably 120° or ⅔ π, the rotor may be driven to establish a rotary movement of the rotor and the shaft.

The charging and driving module 100 is arranged for use in a car 200 as depicted by FIG. 2. The car 200 comprises the inverter circuit 102, the battery 104, the plug 108 and the electrical machine 180 for driving a front wheel 204. Alternatively or additionally, also a rear wheel 208 may be driven as well, by the electrical machine 180 or an additional electrical machine. The car 200 also comprises a control circuit 210 for driving the inverter circuit 102.

The inverter circuit 102 comprises a first group comprising a first switch 112 in parallel with a first diode 114, which group is in series with a second group comprising second switch 116 and a second diode 118 in parallel. In parallel with the two groups of switches and diodes, a group of a third switch 122 and a third diode 124 in parallel is provided in series with a group of a further switch 126 and a fourth diode 128 in parallel. Also a group of a fifth switch 132 and a fifth diode 134 in parallel in series with a group of a sixth switch 136 and a sixth diode 138 in parallel which groups are arranged in series and—in series—are placed parallel with the other groups in series. Hence, three pairs of two groups of a switch and a diode connected in parallel are provided, the two groups being connected in series to one another and the pairs are connected in parallel to one another. The diodes all have the same orientation.

The inverter circuit further comprises a capacitor 106 in parallel to the pairs of groups of a switch and a diode and a first DC terminal 152 and a second DC terminal 154 for connecting the battery 104 in parallel to the capacitor. In parallel to the capacitor, also a seventh diode 144 and an eight diode 148 connected in series are connected to the inverter circuit 102.

Between each of the three groups of switches and diodes, terminals are provided for connecting the inverter circuit 102 to the electrical machine 180. Between the first switch 112 and first diode 114 on one hand and the second switch 116 and the second diode 118 on the other hand, a first phase terminal 162 is provided. Between the third switch 122 and third diode 124 on one hand and the fourth switch 126 and the fourth diode 128 on the other hand, a second phase terminal 164 is provided. Between the fifth switch 132 and fifth diode 134 on one hand and the sixth switch 136 and the sixth diode 138 on the other hand, a third phase terminal 166 is provided. And between the seventh diode 144 and the fourth diode 148, a second charging terminal 172 is provided.

A charging plug 108 is connected to the first charging terminal 188 and the second charging terminal 172.

For driving the electrical machine 180, the switches of the inverter circuit are operated to generate a sine wave at each phase terminal of the inverter circuit 102. This is done by operating the switches in a pulse width modulation (PWM) operation mode. The sine waves at the phase terminals are shifted 120° or $\tfrac{2}{3}\pi$. By changing the frequency of the sine waves, the rotating frequency of the electrical machine 180 can be modified. In this way, a DC voltage provided by the battery 104 is converted to a three-phase AC voltage available at the first phase terminal 162, the second phase terminal 164 and the third phase terminal 166.

The PWM signal may be generated by comparing a sine wave of a target frequency as a reference signal with a saw tooth waveform having a significantly higher frequency, preferably at least ten times as high. The output is a binary signal, changing from 0 to 1 on a continuous timescale. This signal is used to drive the first switch 112. The complement of the signal is used to drive the second switch 116. A further signal for driving the third switch 122 and the fourth switch 126 is generated by shifting the reference signal by 120° or $\tfrac{2}{3}\pi$, where the fourth switch 126 is driven by the complement of the generated further control signal. Another signal for driving the fifth switch 132 is generated by shifting the first reference signal by 240° or $\tfrac{4}{3}\pi$, where the sixth switch 136 is driven by the complement of the generated other control signal. In this way, a fair approximation of a sine wave is generated. Less accurate approximations may also be used, like a block wave or a modified sine wave, but at the cost of efficiency of the electrical machine 180.

The battery 104 is a rechargeable battery that can be charged by via the plug 108 that is connected to the charging and driving module 100. For basic charging operation of the inverter circuit 102 for charging the battery 104, all switches of the inverter circuit 102 are opened, i.e. in non-conductive state. The plug 108 is connected to mains power supply, preferably at 230 Volt at 50 Hz—or 110 Volt at 60 Hz.

In basic charging operation, the inverter circuit, with the three pairs of switch-diode groups, acts as a full-bridge rectifier. The first diode 114, the third diode 124 and the fifth diode 134 are connected in parallel and the second diode 118, the fourth diode 128 and the sixth diode 138 are connected in parallel. This is because the three inductances 182, 184, 186 of the electrical machine 180, connected to the phase terminals, are connected together and provided with a single phase voltage and all switches are open. These groups form one half of the rectifier, equivalent to two diodes in series, with one single phase terminal connected between them. Another half of the full-bridge rectifier is provided by the seventh diode 144 and the eighth diode 148. This circuit equivalent of the configuration is depicted by FIG. 3.

In FIG. 3, the full-bridge rectifier is provided by the seventh diode 144 and the eighth diode 148 on one hand and the first diode equivalent 314 and the second diode equivalent 318. The first diode equivalent 314 is equivalent to the first diode 114, the third diode 124 and the fifth diode 134 in parallel and the second diode equivalent 318 is equivalent to the second diode 118, the fourth diode 128 and the sixth diode 138 in parallel.

In this way, a single-phase alternating current signal supplied to the plug 108 is converted to a direct current signal, equalized by the capacitor 106 and provided to the battery 104.

In case the battery requires a voltage higher than the top voltage of the mains power supply, the switches of the inverter circuit are operated simultaneously in the charging phase. Together with the inductances of the electrical machine 180, this constitutes a power factor control circuit for increasing the output voltage over the first DC terminal 152 and the second DC terminal 154. The actual output voltage over the first DC terminal 152 and the second DC terminal 154 depends on the duty cycle of the switching of the six switches of the inverter circuit 102.

It is important that the first switch 112, the third switch 122 and the fifth switch 132 are operated simultaneously and that the second switch 116, the fourth switch 126 and the sixth switch 136 are operated simultaneously as well in a charging operation via the plug 108. This is because in plug-in charging operation, the car 200 should be and remain stationary and the electrical machine 180 is not to rotate to prevent accidents. Therefore, the current through the three inductances should be substantially the same at each moment in time—which is established by operating the switches simultaneously as indicated above.

On the other hand, in case the batter 104 requires a lower voltage than the top voltage of mains power supply provided to the plug 108, the inverter circuit 102 as shown by FIG. 1 is not sufficient. An inverter circuit 402 as depicted by FIG. 4 comprises a buck converter for converting down the voltage provided by the inverting part of the inverter circuit 402. The buck converter comprises a first buck switch 192, a first buck diode 194, a second buck switch 196, a second buck diode 198 and a buck inductor 190. A person skilled in the art will appreciate that the first buck diode 194 and the second buck switch 196 are optional and may be omitted. The final output voltage provided to the battery 104 is determined by the input voltage, the value of the buck inductor 190 and the duty cycle of the first buck switch 192.

A person skilled in the art will appreciate that various variations to the embodiments as provided above are possible. Instead of the diodes, also other rectifying elements may be used, either active or passive. For the switches, any suitable electronic switch may be used, including, but not limited to Triacs, IGBTs, GTOs, MOSFETs and other. As to the car 200, it is noted that the charging and driving module 100 may also be used for other vehicles like a bicycle.

The circuit 102 of the disclosure can also be used without further amendments when direct voltage is applied over the first charging terminal 188 and the second charging terminal 172 for charging the battery 104. Moreover, the full-bridge rectifier of the disclosure allows the positive and negative conductors of the direct voltage power supply to be connected to the first charging terminal 188 and second charging terminal 172 in any order.

The combined inverter and on-board charger may preferably be realized by using an existing inverter control module 210, and merely modifying the software thereof to include a charging mode. The other modifications that are required are relatively small hardware modifications, such as adding the first and second rectifying elements 144, 148, the first charging terminal 188 connected to the center point of the three static inductors 182, 184, 186, and the second charging terminal 172.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

In the description above, it will be understood that when an element such as layer, region or substrate is referred to as being "on", "onto" or "connected to" another element, the element is either directly on or connected to the other element, or intervening elements may also be present.

Furthermore, the disclosure may also be embodied with less components than provided in the embodiments described here, wherein one component carries out multiple functions. Just as well may the disclosure be embodied using more elements than depicted in the Figures, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A circuit for charging a battery and for driving a three-phase electrical machine comprising at least three static inductors in wye configuration having a first charging terminal connected to a center point, the circuit comprising:

a three-phase DC to AC converter comprising a plurality of switches and rectifying elements, two DC terminals for connecting the battery to the circuit, and three phase terminals for connecting the circuit to the inductors;

a first rectifying element and a second rectifying element connected in series to one another; and a second charging terminal provided between the first rectifying element and the second rectifying element;

wherein the series of the first rectifying element and the second rectifying element is connected to the DC to AC converter parallel to the DC terminals, and the first rectifying element and the second rectifying element have the same orientation as at least two of the rectifying elements of the DC to AC converter so as to form a full-bridge rectifier with the rectifying elements of the DC to AC converter for rectifying an alternating voltage applied over the first charging terminal and the second charging terminal to provide a rectified voltage between the two DC terminals;

wherein the circuit during charging of the battery is configured such that a first, a third and a fifth of the switches operate simultaneously, and a second, a fourth and a sixth of the switches operate simultaneously to ensure that the current through each of the three static inductors is substantially the same at each moment in time.

2. The circuit of claim 1, wherein the DC to AC converter comprises three pairs of two groups of a switch and a rectifying element connected in parallel, the two groups being connected in series to one another with a phase terminal being provided between the two groups and the pairs being connected in parallel to one another and wherein the rectifying elements all have the same orientation.

3. The circuit of claim 1 further comprising a capacitance connected parallel to the DC to AC converter.

4. The circuit of claim 2 further comprising a capacitance connected parallel to the DC to AC converter.

5. The circuit of claim 1 further comprising a DC to DC converter for reducing a converter voltage provided by the DC to AC converter to a charging voltage lower than the converter voltage, the input of the DC to DC converter connected parallel to the DC part of the DC to AC converter and the output of the DC to DC converter connected to the two DC terminals.

6. The circuit of claim 2 further comprising a DC to DC converter for reducing a converter voltage provided by the DC to AC converter to a charging voltage lower than the converter voltage, the input of the DC to DC converter connected parallel to the DC part of the DC to AC converter and the output of the DC to DC converter connected to the two DC terminals.

7. The circuit of claim 3 further comprising a DC to DC converter for reducing a converter voltage provided by the DC to AC converter to a charging voltage lower than the converter voltage, the input of the DC to DC converter connected parallel to the DC part of the DC to AC converter and the output of the DC to DC converter connected to the two DC terminals.

8. The circuit of claim 4 further comprising a DC to DC converter for reducing a converter voltage provided by the DC to AC converter to a charging voltage lower than the converter voltage, the input of the DC to DC converter connected parallel to the DC part of the DC to AC converter and the output of the DC to DC converter connected to the two DC terminals.

9. The circuit of claim 5, wherein the DC to DC converter is a buck converter.

10. The circuit of claim 6, wherein the DC to DC converter is a buck converter.

11. The circuit of claim 7, wherein the DC to DC converter is a buck converter.

12. The circuit of claim 8, wherein the DC to DC converter is a buck converter.

13. A driving and charging module for a vehicle, the module comprising:
- a three-phase electrical machine comprising at least three inductances in Wye configuration having a first charging terminal connected to a center point;
- a circuit comprising
  - a three-phase DC to AC converter comprising a plurality of switches and rectifying elements, two DC terminals for connecting a battery to the circuit, and three phase terminals for connecting the circuit to the inductors,
  - a first rectifying element and a second rectifying element connected in series to one another, and
  - a second charging terminal provided between the first rectifying element and the second rectifying element,
  - wherein the series of the first rectifying element and the second rectifying element is connected to the DC to AC converter parallel to the DC terminals, and the first rectifying element and the second rectifying element have the same orientation as at least two of the rectifying elements of the DC to AC converter as to form a full-bridge rectifier with the rectifying elements of the DC to AC converter for rectifying an alternating voltage applied over the first charging terminal and the second charging terminal to provide a rectified voltage between the two DC terminals;
- wherein the circuit during charging of the battery is configured such that a first, a third and a fifth of the switches operate simultaneously, and a second, a fourth and a sixth of the switches operate simultaneously to ensure that the current through each of the three static inductors is substantially the same at each moment in time; and
- a connector connected to the first charging terminal and the second charging terminal.

14. The module of claim 13, wherein the DC to AC converter comprises three pairs of two groups of a switch and a rectifying element connected in parallel, the two groups being connected in series to one another with a phase terminal being provided between the two groups and the pairs being connected in parallel to one another and wherein the rectifying elements all have the same orientation.

15. The module of claim 13 further comprising a capacitance connected parallel to the DC to AC converter.

16. The module of claim 13 further comprising a DC to DC converter for reducing a converter voltage provided by the DC to AC converter to a charging voltage lower than the converter voltage, the input of the DC to DC converter connected parallel to the DC part of the DC to AC converter and the output of the DC to DC converter connected to the two DC terminals.

17. A vehicle comprising:
- at least two wheels;
- a driving and charging module connectable to a battery, the module comprising a three-phase electrical machine comprising at least three inductances in Wye configuration having a first charging terminal connected to a center point;
- a circuit comprising
  - a three-phase DC to AC converter comprising a plurality of switches and rectifying elements, two DC terminals for connecting a battery to the circuit, and three phase terminals for connecting the circuit to the inductors,
  - a first rectifying element and a second rectifying element connected in series to one another, and
  - a second charging terminal provided between the first rectifying element and the second rectifying element,
  - wherein the series of the first rectifying element and the second rectifying element is connected to the DC to AC converter parallel to the DC terminals, and the first rectifying element and the second rectifying element have the same orientation as at least two of the rectifying elements of the DC to AC converter as to form a full-bridge rectifier with the rectifying elements of the DC to AC converter for rectifying an alternating voltage applied over the first charging terminal and the second charging terminal to provide a rectified voltage between the two DC terminals;
- wherein the circuit during charging of the battery is configured such that a first, a third and a fifth of the switches operate simultaneously, and a second, a fourth and a sixth of the switches operate simultaneously to ensure that the current through each of the three static inductors is substantially the same at each moment in time;
- a connector connected to the first charging terminal and the second charging terminal; and
- a control module for controlling the switches of the circuit;
- wherein at least one of the two wheels is connected to the three-phase electrical machine for driving the at least one of the two wheels.

18. The vehicle of claim 17, wherein the DC to AC converter comprises three pairs of two groups of a switch and a rectifying element connected in parallel, the two groups being connected in series to one another with a phase terminal being provided between the two groups and the pairs being connected in parallel to one another and wherein the rectifying elements all have the same orientation.

19. The vehicle of claim 17 further comprising a capacitance connected parallel to the DC to AC converter.

20. The vehicle of claim 17 further comprising a DC to DC converter for reducing a converter voltage provided by the DC to AC converter to a charging voltage lower than the converter voltage, the input of the DC to DC converter connected parallel to the DC part of the DC to AC converter and the output of the DC to DC converter connected to the two DC terminals.

* * * * *